United States Patent
Kamal et al.

(10) Patent No.: US 12,177,567 B2
(45) Date of Patent: Dec. 24, 2024

(54) EFFICIENT UNWANTED REFLECTION ARTIFACT MITIGATION IN VIDEOS FOR EMBEDDED DEVICES

(71) Applicant: Apple Inc., Cupertino, CA (US)

(72) Inventors: Ahmed T. Kamal, San Jose, CA (US); Feng Li, Fremont, CA (US); Florian Ciurea, Campbell, CA (US); Jianping Zhou, Fremont, CA (US); Saeed Izadi, Coquitlam (CA); Sebastien X. Beysserie, San Jose, CA (US); Stephane S. Ben Soussan, San Francisco, CA (US)

(73) Assignee: Apple Inc., Cupertino, CA (US)

(*) Notice: Subject to any disclaimer, the term of this patent is extended or adjusted under 35 U.S.C. 154(b) by 413 days.

(21) Appl. No.: 17/805,399

(22) Filed: Jun. 3, 2022

(65) Prior Publication Data
US 2023/0396883 A1 Dec. 7, 2023

(51) Int. Cl.
| G06V 10/60 | (2022.01) |
| G06T 5/70 | (2024.01) |
| G06V 10/75 | (2022.01) |
| H04N 23/67 | (2023.01) |
| H04N 23/68 | (2023.01) |

(52) U.S. Cl.
CPC ............ H04N 23/683 (2023.01); G06T 5/70 (2024.01); G06V 10/60 (2022.01); G06V 10/751 (2022.01); H04N 23/67 (2023.01)

(58) Field of Classification Search
CPC .... H04N 23/683; H04N 23/67; H04N 23/687; H04N 23/81; H04N 23/6812; G06T 5/70; G06V 10/60; G06V 10/751
See application file for complete search history.

(56) References Cited

U.S. PATENT DOCUMENTS

| 9,020,281 B2* | 4/2015 | Yamashita ............. G03B 43/00 382/224 |
| 2011/0182520 A1* | 7/2011 | Free ..................... G06V 40/164 345/426 |

FOREIGN PATENT DOCUMENTS

| CN | 113763528 A | * 12/2021 |
| JP | 2008289034 A | * 11/2008 |

* cited by examiner

Primary Examiner — Carol Wang
(74) Attorney, Agent, or Firm — Blank Rome LLP

(57) ABSTRACT

Devices, methods, and non-transitory computer readable media are disclosed herein to repair or mitigate the appearance of unwanted reflection artifacts in captured video image streams. These unwanted reflection artifacts often present themselves as brightly-colored spots, circles, rings, or halos that reflect the shape of a bright light source in the captured image. These artifacts, also referred to herein as "ghosts" or "green ghosts" (due to often having a greenish tint), are typically located in regions of the captured images where there is not actually a bright light source located in the image. In fact, such unwanted reflection artifacts often present themselves on the image sensor across the principal point of the lens from where the actual bright light source in the captured image is located. Such devices, methods and computer readable media may be configured to detect, track, and repair such unwanted reflection artifacts in an intelligent and efficient fashion.

20 Claims, 8 Drawing Sheets

EFFICIENT UNWANTED REFLECTION ARTIFACT MITIGATION IN VIDEOS FOR EMBEDDED DEVICES

TECHNICAL FIELD

This disclosure relates generally to the field of digital image processing. More particularly, but not by way of limitation, it relates to techniques for efficiently mitigating the appearance of unwanted reflection artifacts in video image streams.

BACKGROUND

The advent of portable integrated computing devices has caused a wide proliferation of cameras and other video capture-capable devices. These integrated computing devices commonly take the form of smartphones, tablets, or laptop computers, and typically include general purpose computers, cameras, sophisticated user interfaces including touch-sensitive screens, and wireless communications abilities through Wi-Fi, Bluetooth, LTE, HSDPA, New Radio (NR), and other cellular-based or wireless technologies. The wide proliferation of these integrated devices provides opportunities to use the devices' capabilities to perform tasks that would otherwise require dedicated hardware and software.

For example, integrated computing devices, such as smartphones, tablets, and laptop computers typically have one or more embedded cameras. These cameras generally amount to lens/camera hardware modules that may be controlled through the use of a general-purpose computer using firmware and/or software (e.g., "Apps") and a user interface, including touch-screen buttons, fixed buttons, and/or touchless controls, such as voice control. The integration of high-quality cameras into these integrated communication devices, such as smartphones, tablets, and laptop computers, has enabled users to capture and share images and videos in ways never before possible. It is now common for users' smartphones to be their primary image and video capture device of choice.

Cameras that are optimized for inclusion into integrated computing devices, and, particularly, into small or portable integrated computing devices, such as smartphones or tablets, may often face various constraints, e.g., processing power constraints, thermal constraints—and even physical size constraints—that cause manufacturers to make tradeoffs between using cameras with optimal image capture capabilities and those that will meet the constraints of the computing devices into which they are being integrated. In particular, unwanted artifacts may often appear in digital images captured by such integrated camera devices, e.g., due to the optics of the lenses used, sensor characteristics, and/or the aforementioned constraints faced by integrated image capture devices.

One type of artifact that will be discussed in greater detail herein is referred to as an unwanted reflection artifact. These unwanted reflection artifacts often present themselves as brightly-colored spots, circles, rings, or halos that reflect the shape of a bright light source in the captured image. These artifacts, also referred to herein as "ghosts" or "green ghosts" (due to often having a greenish tint), are typically located in regions of the captured images where there is not actually a bright light source located in the image. In fact, such unwanted reflection artifacts often present themselves on the image sensor at a location mirrored across the principal point of the lens from where the actual bright light source in the captured image is located. Moreover, the position of these artifacts can change rapidly and unexpectedly during the capture of a video image stream, e.g., due to user hand shake, intentional movement of the camera to capture different parts of a scene over time, changes to the camera's focus and/or zoom levels, and the like.

Thus, in order to repair or mitigate the appearance of these unwanted reflection artifacts in captured video image streams, it would be desirable to have methods and systems that detect, track, and repair such unwanted reflection artifacts in an intelligent and efficient fashion.

SUMMARY

Devices, methods, and non-transitory computer readable media are disclosed herein to repair or mitigate the appearance of unwanted reflection artifacts (also referred to herein as "ghosts" or "green ghosts") in captured video image streams. Such devices, methods and computer readable media may be configured to detect, track, and repair such unwanted reflection artifacts in an intelligent (e.g., machine learning-enabled) and efficient fashion, while striking an aesthetically-appropriate balance between an amount of image processing resources spent on the detecting and tracking of such unwanted reflection artifacts and the strength of the unwanted artifact repair operations that are applied to the image data across a captured video image stream.

In one embodiment, the techniques comprise: obtaining a first sequence of images captured by an image capture device of an electronic device; detecting, in a first image of the first sequence, an estimated location of a light source (e.g., the Sun, a spotlight, or other artificial or natural bright light source located within a captured scene); determining an estimated location of an unwanted reflection of the light source in the first image based, at least in part, on the estimated location of the light source in the first image; repairing the unwanted reflection of the light source in the first image; obtaining positional information associated with the electronic device during the capture of a second image of the first sequence, wherein the second image is captured subsequently to the first image; determining an estimated location of the unwanted reflection of the light source in the second image based, at least in part, on: (a) the estimated location of the unwanted reflection of the light source in the first image; and (b) the obtained positional information associated with the electronic device during the capture of the second image; and repairing the unwanted reflection of the light source in the second image. (These techniques may then be repeated across some or all of the images in a captured image sequence, with the reference to "first image" and "second image" above merely being representative of the operations that could be carried out on exemplary images of the image sequence, and not intended to limit the performance of the techniques to image sequences having only two images.)

In some embodiments, the positional information comprises information obtained from one or more of: (a) a gyrometer integrated into the electronic device; (b) an accelerometer integrated into the electronic device; or (c) an optical image stabilization (OIS) system of the image capture device of the electronic device.

In some embodiments, the estimated location of the unwanted reflection of the light source in the first image may comprise a region of pixels (e.g., a tile or rectangle or region of any other desired shape or size). In some such embodiments, the size of the region of pixels may be determined based, at least in part, on one or more of: a focus level of the image capture device during capture of the first image; or a zoom level of the image capture device during capture of the first image. In some such embodiments, the location of the region of pixels, may be constrained to be located across a principal point of a lens of the image capture device that captured the image. In yet further embodiments, a probability value corresponding to an estimated likelihood that a given pixel is part of the unwanted reflection of the light source in the first image may be determined for each pixel in the region of pixels. In some cases, determining the estimated location of the unwanted reflection of the light source may further comprise identifying an elliptical sub-region of pixels within the region of pixels (e.g., in embodiments when it is known or imposed that the identified light source have an elliptical shape).

In other embodiments, repairing the unwanted reflection of the light source in the first image may comprise utilizing a trained neural network (NN) to determine values for the pixels in the identified elliptical sub-region of pixels, wherein the NN is trained to determine pixel values that remove unwanted light source reflections from regions of images. In some such embodiments, the NN may be trained on a combination of synthetic image data and real image data. In order to soften the repairs determined by the NN, in some embodiments, the values for the pixels in the identified elliptical sub-region of pixels may ultimately be determined by blending (e.g., using an alpha blending operation) between: (a) the values for the pixels in the identified elliptical sub-region of pixels determined by the NN; and (b) the values of the pixels in the identified elliptical sub-region of pixels in the first image as captured. In some cases, the blending operation may be performed according to an estimated repair confidence parameter that reflects an estimated confidence level in the ability of the values for the pixels in the identified elliptical sub-region of pixels determined by the NN to repair the unwanted reflection artifact in the first image (i.e., "successfully" repair the artifact by removing or reducing its appearance in the image via the use of natural-looking replacement pixel values determined by the NN). As used herein, it is to be understood that a higher repair confidence will lead to a stronger repair being applied to a detected artifact in the image and, conversely, a lower repair confidence will lead to a weaker repair being applied to a detected artifact in the image. In some instances, the repair of an unwanted reflection artifact may be further based, at least in part, on an estimated color cast of the image that is being repaired.

In order to provide increased temporal consistency in the look of the repair operations over time in the video image sequence, in some embodiments, an estimated repair confidence parameter may be determined by estimating an initial repair confidence parameter value for the first image and then filtering the value of the initial repair confidence parameter for the first image based, at least in part, on initial repair confidence parameter values estimated for one or more images from the first sequence of images captured subsequently to the first image. For example, a rate of change in the filtered repair confidence parameter value over the sequence of images may be constrained by the maximum (or minimum) initial repair confidence parameter value of a predetermined number of image frames that were captured subsequently to the first image. In such cases, the filtering operation may be performed as a post-processing operation, i.e., performed after the predetermined number of images frames have been captured and their initial repair confidence parameter values have been determined.

In some embodiments, to further improve efficiency of the mitigation operations, the detection of the estimated location of a light source in the first sequence may only be performed each time a predetermined number of images (e.g., 15 images, 30 images, 60 images, etc.) have been captured as part of the first sequence of images. In such embodiments, for each image captured as part of the first sequence of images for which an estimated location of a light source is not detected, the method may instead obtain positional information associated with the electronic device during the capture of each said image and determine an estimated location of the unwanted reflection of the light source in said images based, at least in part, on: (a) the estimated location of the unwanted reflection of the light source in the immediately preceding image captured as part of the first sequence of images; and (b) the obtained positional information associated with the electronic device during the capture of said image for which an estimated location of a light source was not detected.

Various non-transitory computer readable media embodiments are disclosed herein. Such computer readable media are readable by one or more processors. Instructions may be stored on the computer readable media for causing the one or more processors to perform any of the techniques disclosed herein.

Various programmable electronic devices are also disclosed herein, in accordance with the program storage device embodiments enumerated above. Such electronic devices may include one or more image capture devices, such as optical image sensors/camera units; a display; a user interface; one or more processors; and a memory coupled to the one or more processors. Instructions may be stored in the memory, the instructions causing the one or more processors to execute instructions in accordance with the various techniques disclosed herein.

DETAILED DESCRIPTION

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" (or similar) means that a particular feature, structure, or characteristic described in connection with the embodiments is included in at least one embodiment of one of the inventions, and multiple references to "one embodiment" or "an embodiment" should not be understood as necessarily all referring to the same embodiment.

Introduction and Problem Background

As described above, due to the interplay of various optical elements in a camera, various bright light sources, including the Sun, can cause "ghosting" image artifacts in captured images, which can deteriorate image quality and/or obscure other elements in a captured scene. In the case of captured video image sequences (i.e., as opposed to still image capture), even more challenges are present, such as enforcing a temporal consistency of any artifact repair/mitigation operations applied to the images over the duration of the image sequence, operating within an allotted power, thermal, and/or processing time budget an integrated device, etc. Thus, presented herein are efficient techniques to detect, track, and mitigate unwanted reflection artifacts, such as so-called "green ghosts" in captured video image sequences. In some cases, the processing techniques described herein may be configured to operate in "real time," e.g., analyzing the individual image frames for artifacts as they are captured—and then applying the unwanted reflection artifact repairs directly afterwards, thereby allowing the repaired image frames to be saved to long term memory storage.

Figure 1:
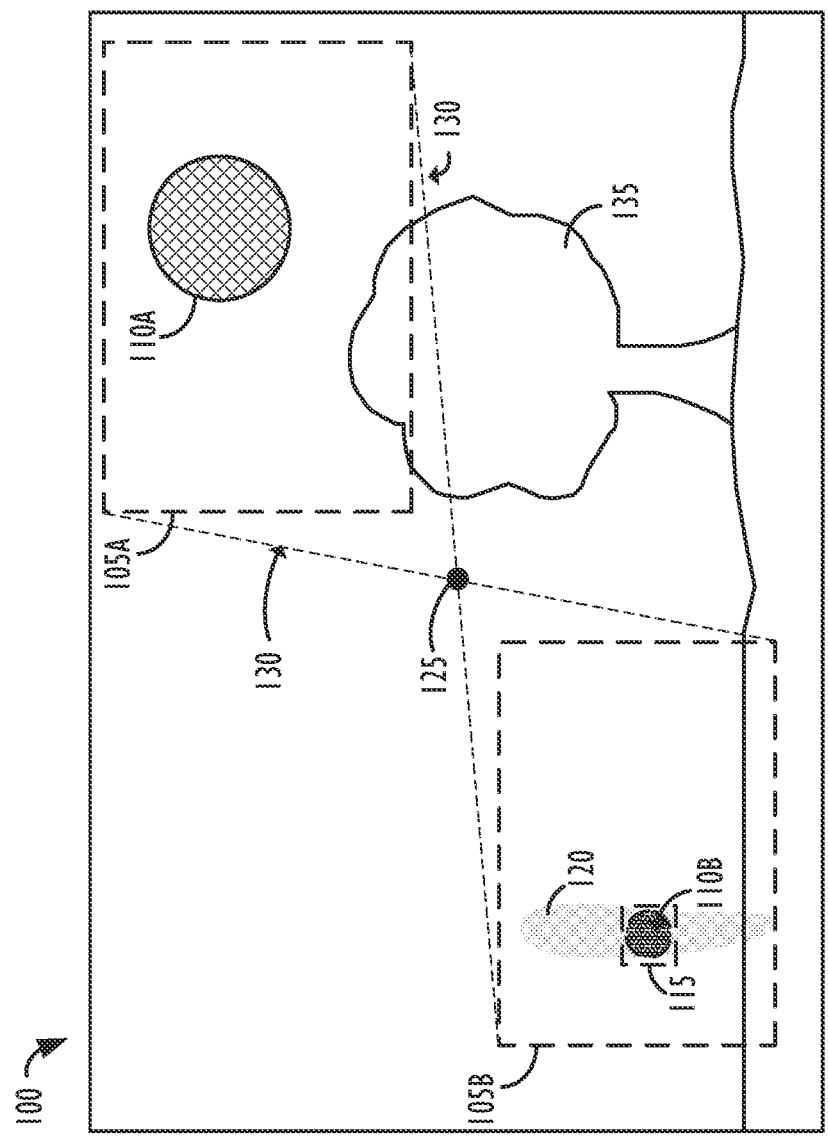
FIG. 1 illustrates an exemplary video image captured of an exemplary scene exhibiting unwanted reflection artifacts, according to one or more embodiments.

Turning now to FIG. 1, an exemplary video image 100 captured of an exemplary scene including the Sun 110A and a tree 135 and exhibiting unwanted reflection artifacts is illustrated, according to one or more embodiments. In image 100, there is a bright light source, in this case, the Sun 110A. By applying various heuristics and/or image metadata, e.g., based on image pixel brightness levels, shape, estimated scene depth, etc., a region 105A of the image may be estimated and extracted as containing a bright light source in the captured scene. Next, based on one or more other heuristics and/or image metadata, e.g., based on a zoom level of the camera, a focus level of the camera, an adjusted principal point of the camera's lens, etc., a size and location of a region 105B of the image may be estimated and extracted as comprising a search space for an unwanted reflection artifact of the bright light source in the captured scene.

A simple lens may be defined as having two spherical surfaces, wherein each of these spherical surfaces has its own spherical center. The line that goes through these two spherical centers is referred to herein as the "principal axis" of the lens. A complex lens system also has an equivalent principal axis. The point where the principal axis intersects the image plane is defined as the "principal point." The principal point may or may not be perpendicular to the image plane/image sensor, depending on the characteristics of the lens system. In some embodiments, the location of region 105B of the image may be determined, at least in part, by "mirroring" the estimated location of the light source region 105A across a principal point of a lens of the image capture device of the electronic device (represented by principal point 125). According to some such embodiments, the "mirrored" point of a hypothetical point "A" across the "principal point" may be defined as: the point that falls on the straight line connecting point "A" and principal point, but on the opposite side of the principal point (i.e. as compared to the side where point "A" is located) and which also maintains the same distance from the principal point as point "A" (e.g., as represented by mirroring lines 130 in FIG. 1).

Within region 105B of the image, an image tile 115 may be searched for and determined that represents a sub-region of pixels within the region 105B may be estimated where the unwanted reflection artifact is most likely to be located. As will be explained in further detail below with reference to FIG. 3, according to some embodiments, within image tile 115, a most likely location 110B of the unwanted reflection artifact may also be determined, e.g., by computing a probability mask over the pixels in region 105B, including in image tile 115, based, at least in part, on the brightness of the pixels, the color or shape pattern of the brightest pixels in the region, a motion signature of the brightest pixels over several captured image frames, etc. Pixels within the probability mask with greater than a predetermined threshold probability level may then be deemed to be part of the unwanted reflection artifact, subject to any further image-based refinement operations that may be employed, as will also be explained in further detail below with reference to FIG. 3.

In some captured scenes, there may also be additional so-called "lens flare" (120) artifacts in the captured image. In some such cases, the lens flare may be adjacent to or surrounding the unwanted reflection artifact 110B. Correction and/or mitigation of unwanted lens flare artifacts is outside the scope of this disclosure, as it is caused by a different phenomenon and has different characteristics, causing the need for different repair and mitigation strategies than may be employed on ghosting artifacts such as those described herein.

As may be understood, for integrated electronic devices with multiple image capture devices, the size and/or location of the search space region 105B for the unwanted reflection artifact may be modified as needed, e.g., depending on the particular optical properties and/or metadata of the particular image capture device used to capture the image. In some cases, electronic device metadata, including time of day, time of year, GPS position of the electronic on Earth, etc., may also be leveraged to estimate an expected position of the Sun and/or an expected overall color cast of the captured image (especially for images where the Sun is likely to be the bright light source that is causing the unwanted reflection artifacts), which may have an effect on the expected color of the pixels making up the unwanted reflection artifact (e.g., making them more likely to be whitish or yellowish in tint, rather than greenish).

Exemplary Unwanted Reflection Artifact Mitigation Image Processing Pipeline

Figure 2:
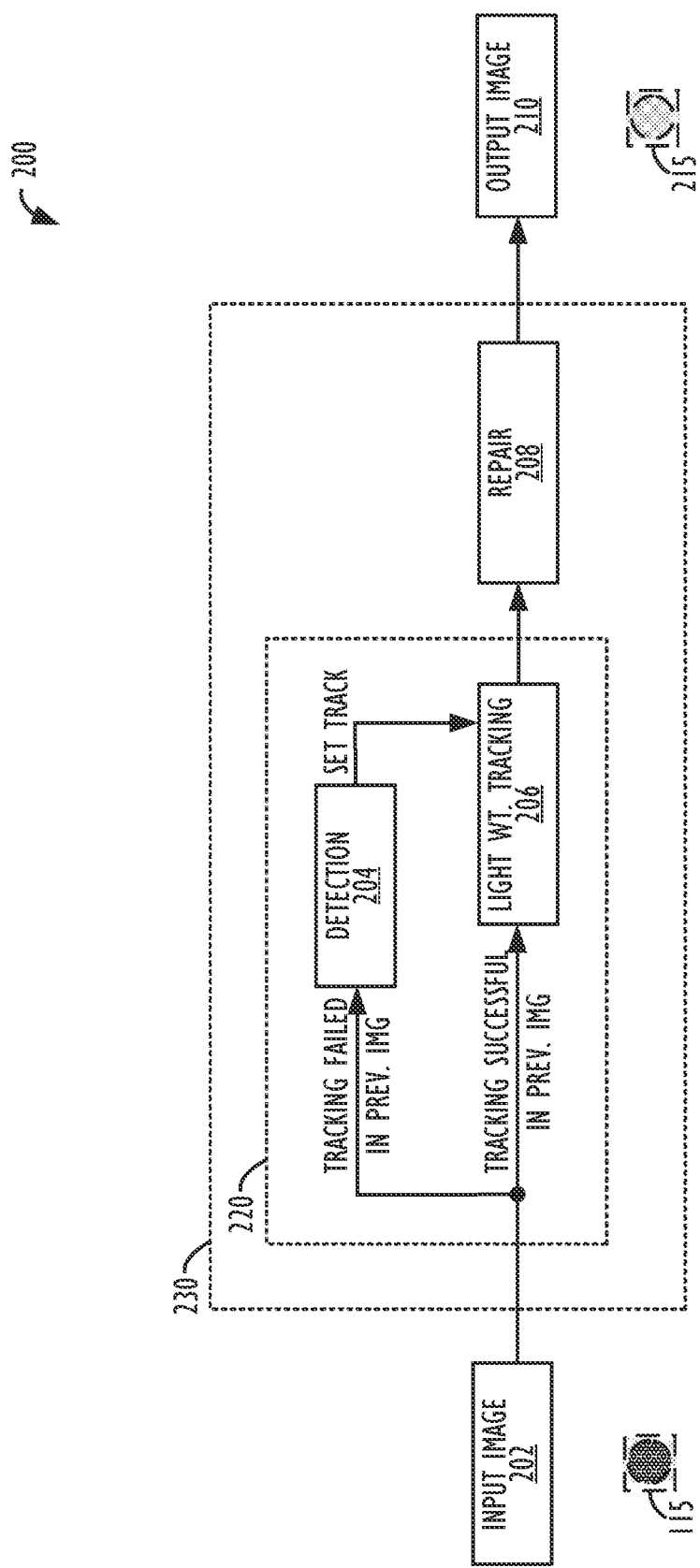
FIG. 2 is an image processing pipeline illustrating an exemplary method of performing unwanted reflection artifact mitigation in video image streams, according to one or more embodiments.

Turning now to FIG. 2, an image processing pipeline 200 illustrating an exemplary method of performing unwanted reflection artifact mitigation in video image streams is shown, according to one or more embodiments. First, an input image 202 may be obtained. As described above, the input image 202 may comprise one or more regions containing unwanted reflection artifacts (e.g., exemplary image tile 115 from FIG. 1) that it may be desired to repair or mitigate. The input image 202 may then be sent to the unwanted reflection mitigation portion 230 of the image processing pipeline 200. The unwanted reflection mitigation portion 230 may begin with the detection and tracking sub-portion 220 of the image processing pipeline 200, which may begin with a so-called "lightweight" tracking block 206 operation (which will be explained in greater detail with reference to FIG. 4). In some embodiments, lightweight tracking block 206 may be employed any time a detection and/or tracking operation was successful for a previously-captured image frame. In other words, if the location of the artifact in the previous image frame is already known, unwanted reflection detection process 204 operation (which will be explained in greater detail with reference to FIG. 3) may be avoided.

As shown in FIG. 2, if, instead, a detection and/or tracking operation was not successful for a previously-captured image frame, a more processing-intensive unwanted reflection detection process 204 operation may be performed on the input image 202. To gain further processing efficiencies, according to some embodiments, the more processing-intensive unwanted reflection detection process 204 operation may be performed only once every predetermined number (n) of captured image frames, e.g., every 30 image frames, 45 image frames, 60 image frames, etc. For image frames falling between the predetermined n-th captured image frames, the estimated location of the unwanted reflection artifact may be determined at lightweight tracking block 206, based on: (a) the estimated location of the unwanted reflection artifact in a previous image frame (e.g., an immediately-previous captured image frame, the immediately-previous captured image frame for which the more processing-intensive unwanted reflection detection process 204 was performed, or another previously-captured image frame(s) having a high confidence artifact location estimate); and (b) additional information that is available to the electronic device, e.g., positional information of the electronic device from an accelerometer or gyrometer, optical image stabilization (OIS) position data, or the like, obtained during the capture of such image frame falling between the predetermined n-th captured image frames. In still other embodiments, to gain yet further processing efficiencies, the lightweight tracking block 206 operation may simply continue to be performed for as long as (i.e., over as many captured image frames as) the tracking operation is still able to successfully track the location of the unwanted reflection artifact (e.g., tracking the location of the artifact with greater than a minimum required tracking threshold confidence level). Then, as soon as the tracking operation fails, pipeline 200 may return to periodically performing the more processing-intensive unwanted reflection detection process 204 operation (e.g., on every n-th captured image frame, as described above).

Next, at block 208, an image repair or mitigation operation (which will be explained in greater detail with reference to FIGS. 5C and 5D) may be performed to mitigate the appearance of the unwanted reflection artifact from the input image 202 and generate a repaired output image 210, which may be saved to storage. As shown in FIG. 2, repaired image tile 215 illustrates an exemplary result of the unwanted reflection artifact repair operation. For example, the repaired image tile pixel values in image tile 215 have lighter gray pixels than the pixels in the unrepaired image tile 115, indicating that the appearance of the unwanted reflection artifact has been mitigated to an extent, but not so strongly that it would be likely to result in unwanted (and potentially visually jarring) flickering in the repaired region of the images over the duration of the repaired video image sequence.

Figure 3:
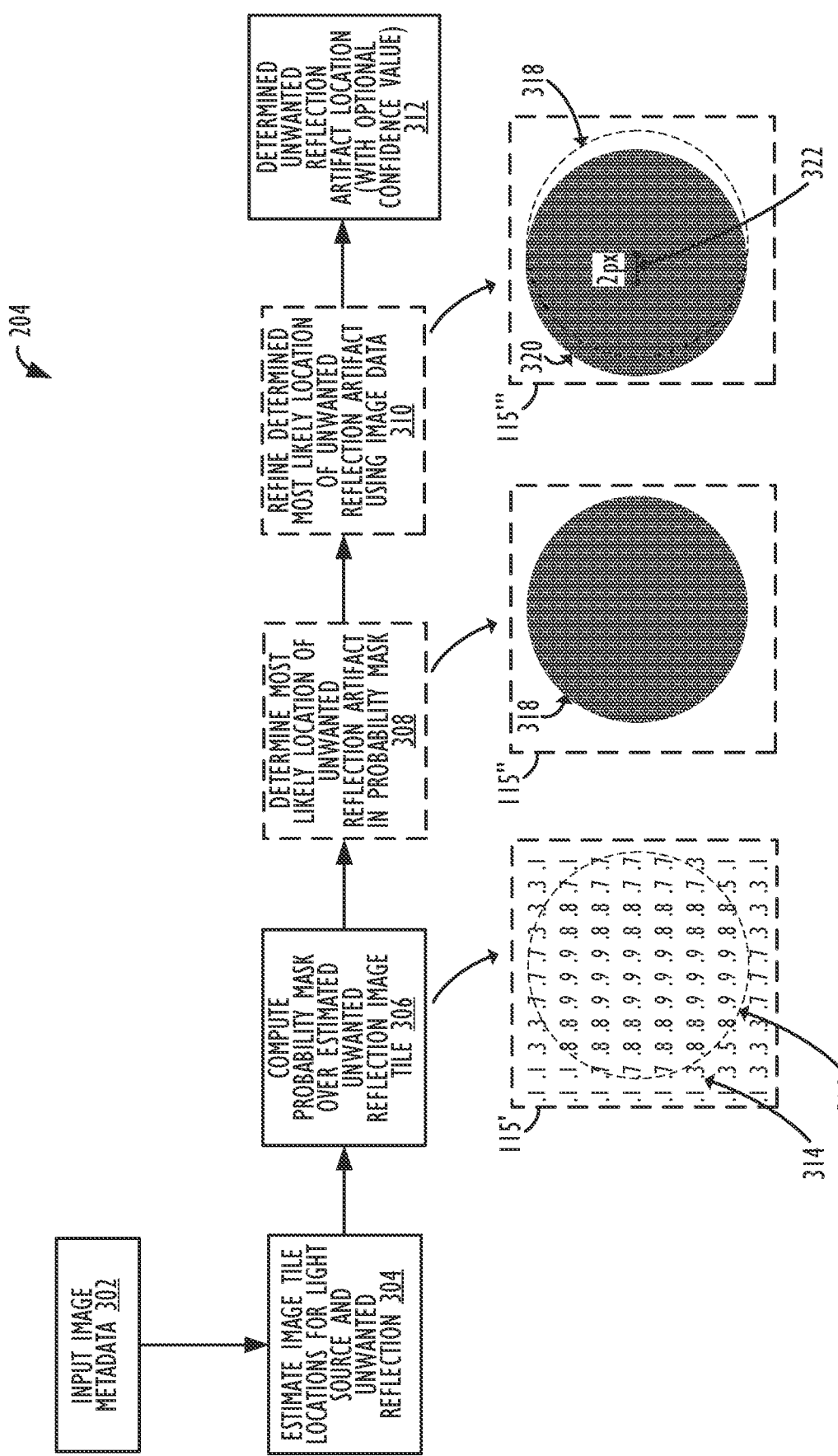
FIG. 3 is an image processing pipeline illustrating an exemplary method of performing unwanted reflection artifact detection in video image streams, according to one or more embodiments.

FIG. 3 is an image processing pipeline 204, illustrating further details for an exemplary method of performing unwanted reflection artifact detection in video image streams, according to one or more embodiments. First, at block 302, various forms of metadata for an input image may be obtained. For example, the metadata for the input image may comprise: image pixel brightness levels, shape, estimated scene depth, camera zoom level, camera focus level, adjusted principal point, and the like. All of the metadata signals may be used as cues at block 304 to estimate image tile locations within the input image for both the unwanted reflection artifact and the bright light source in the scene causing the unwanted reflection artifact. As discussed above, based, at least in part, on an estimated location of the bright light source in the scene causing the unwanted reflection, a search space in the image for the unwanted reflection artifact may be identified, within which the location and size of an image tile that is most likely to contain the unwanted reflection artifact may be estimated. In the process of estimating the identified unwanted reflection artifact image tile, various factors may be analyzed, e.g., pixel intensity, pixel color, the size, shape, motion signature, and/or pattern of pixels with high intensities, in order to compute, at block 306, a probability mask over the identified search space for the unwanted reflection artifact image tile. In some embodiments, these artifact detection operations may be performed over downscaled versions of the image data (e.g., ½ resolution versions, ¼ resolution versions, etc.), so as to achieve even greater processing efficiency.

Exemplary probability mask 115' shows hypothetical artifact probability values for pixels falling within an identified image tile 115 likely possessing an unwanted reflection artifact. As illustrated, in some embodiments, each pixel may have a normalized probability value of 0 to 1, with a threshold probability value (e.g., 0.6) required for a pixel to be considered likely to be "in" the mask of pixels that represent the unwanted reflection artifact. Due to various factors, e.g., pixel intensity, pixel color, the size, shape and/or pattern of pixels with high intensities, in some embodiments, certain pixels (e.g., pixel 314) may receive lower scores in the probability mask (e.g., 0.3) and thus be excluded from the mask of pixels ultimately representing the unwanted reflection artifact, while other pixels (e.g., pixel 316) may receive higher scores in the probability mask (e.g., 0.9)—and thus be included in the mask of pixels representing the unwanted reflection artifact. In some embodiments, there may be even further constraints placed upon the shape of the unwanted reflection artifact, such as having to be elliptical in shape, having to take up a certain percentage of the pixels in the identified image tile, having a minimum and/or maximum overall size or diameter, etc.

At block 308, the image processing pipeline may optionally determine a most likely location of the unwanted reflection artifact in probability mask. Exemplary mask 115" shows a hypothetical artifact location and boundaries 318 within identified image tile 115 (for example, the boundary of artifact location 318 may comprise a mask including all pixels within the dashed line drawn in exemplary probability mask 115' containing the pixels with high probability values). In other embodiments, more simplified techniques may be employed at block 308 to determine the most likely location of the unwanted reflection artifact. For example, in some such embodiments, the techniques may simply pick the location in the mask 115' that has the highest probability value of being a reflection artifact, i.e., the highest peak in the mask 115'. In such embodiments, it may not be as important to precisely determine the exact shape of the reflection artifact. In fact, often, the edges of the reflection artifact region are not very sharp. Thus, according to some such embodiments, a tunable artifactSize parameter may be used, which may be based on the length (e.g., in terms of pixels) of one (or both) sides of the estimated mask 115' region. The artifactSize parameter may then be adjusted with every subsequently-captured image frame (or n-th image frame) based, e.g., on metadata, such as focal length, pixel size, zoom level, defocus blur amount, etc. Based, at least in part, on these various metadata factors, an adjusted artifactSize parameter may be computed for each image frame just before the artifact detection and/or tracking operations are performed on the image frame. The techniques may then search for the artifact candidate shape/location that gives the highest artifact probability value for the computed artifactSize.

The ellipse shown at artifact location 318 thus represents the pixels whose values will later be repaired/inpainted during the repair operation at block 208 of the image processing pipeline (e.g., by having their repaired values hallucinated, at least in part, by a neural network). In some embodiments, artifact location 318 may simply comprise a maximum-sized circle fitting the estimated mask 115' region.

In some embodiments, a predefined reflection artifact size may be used, e.g., based on one or more camera parameters or experimental validation. In other embodiments, the predefined reflection artifact size for a given captured image may be automatically adjusted, e.g., based on one or more camera parameters, zoom level, or focus level, etc. In still other embodiments, either the predefined or the automatically adjusted reflection artifact size can be further refined through image-based methods, e.g., a grid-based search or a gradient descent-based search. In a grid-based search, various artifact size candidates may be tested, and the candidate producing the reflection artifact having a highest score (e.g., a shapeScore, as will be described below) may be selected as the chosen artifact size. In a gradient descent-based search approach, the reflection artifact size may be dynamically adjusted with each captured image frame in which it is tracked. For every tracked image frame, the size of the reflection artifact may be intentionally perturbed in a randomized fashion. Then, the current shapeScore may be compared with the shapeScore of previous tracked frame, and the size of the artifact may be adjusted in the correct direction to yield a better shapeScore for the artifact. Essentially, this process results in a gradient descent operation being performed with a control signal. The end result is that, even if the artifact size was set wrong initially, within a few image frames, it will converge to a tight bounding box around the artifact, result in better tracking, and thus higher repair confidence values and higher repair strengths being used to mitigate the unwanted reflection artifact.

At block 310, the image processing pipeline may optionally refine the determined most likely location of the unwanted reflection artifact, e.g., using image-based data. In some cases, an initial hypothetical artifact location 318 may be determined by a combination of camera properties, measured positional information, and other metadata, but, due to imperfections in the camera motion modeling, the presences of greenish tinted pixels concentrated around the border of the artifact region (i.e., as opposed to the center of the artifact region), and/or inaccuracies in the metadata, the initial hypothetical artifact location 318 may be off by several pixels from the actual central location of the bright/fully-saturated pixels making up the unwanted reflection artifact or "green ghost" in the captured image. For example, mask 115''' shows a refined artifact location 320 that is shifted (322) by 2 pixels to the left from the location of hypothetical artifact location 318 within identified image tile 115. In some cases, the refinement operation that may look at, e.g., the shape of the artifact region and/or the pixel colors and intensities of the pixels at the border of (or bordering) the artifact region when determining how far to shift the initial artifact location estimate. In some embodiments, the image-based refinement operation at block 310 may be limited to +/−a predetermined maximum permitted number of pixels (e.g., 2 pixels, 4 pixels, or 8 pixels) available to shift in each of the horizontal and vertical directions, so as to place an upper limit on the amount of additional image processing operations performed by block 310. It is to be understood that, in other embodiments, determination of the hypothetical artifact location and its precise boundaries within the identified image tile for the unwanted reflection artifact, e.g., as shown in blocks 308 and 310, may, instead, not be performed at all (e.g., just placing a maximum-sized circle centered in the tile)—or may not be performed until part of the repair operation at block 208.

Finally, at block 312, the image processing pipeline may determine the final unwanted reflection artifact location (along with an optional confidence value). In some cases, the confidence value associated with a detected unwanted reflection artifact may be based on how closely the determined artifact shape or location matches an expected artifact shape and location within the image, and/or how closely the colors and intensities of the pixels within the determined artifact shape match the expected color and intensity of the artifact (e.g., based on an estimated color cast of the image or the light source, the size/brightness/shape/scene depth of the light source, the camera's zoom/focus settings when capturing the image, etc.). The confidence value may also be a function of how much textural detail is in the image at the detected location of the unwanted reflection artifact (i.e., the more textural detail there is in the region of the image where the artifact has been detected, the less confidence there may be in the detected location/shape/boundaries of the artifact, and vice versa).

For example, in some embodiments, a shapeScore may be computed for the located artifact (e.g., a measure of "circular-ness," i.e., in cases where a circular artifact is expected—a value of '1' may be used to mean a perfectly-circular artifact, and then the shapeScore may decrease down to '0' for less and less circular shapes) at the estimated artifact location, as well as for the other candidate artifact locations within the +/−n-pixel refinement search space. In some such embodiments, the refined location for the artifact may be the location of the artifact having the highest shapeScore value. In other embodiments, the shapeScore may be computed in different ways. For example, according to some embodiments, the shapeScore for a reflection artifact centered around a hypothesis point, p, may be computed by first identifying a block of pixels centered around point p having dimensions of "artifactSize×artifactSize." For pixels close to the center of this block, a gradient score may be computed as: −abs(gradient), i.e., the presence of any gradient/texture in the image pixels will reduce the gradient score metric, meaning that a flat (i.e., texture-free) area will be preferred in the center of the block. For pixels closer to the edge of the block, the gradient score may be computed as the projection of the image gradient in the direction from that pixel towards the current hypothetical center point, p. The sum of those per-pixel gradient scores is then mapped with a non-linear function bounded between [0, 1], which value may then serve as the shapeScore for the artifact at that location.

Then, at the determined location, the textural detail level (also referred to herein as the "context") may be computed for a region of pixels surrounding the artifact, e.g., a region extending from 1 to 10 pixels beyond the borders of the artifact region 115'. Next, a contextScore may be computed for the context region (e.g., a measure of the amount of texture in the context region—i.e., a value of '1' may be used to mean a perfectly textureless, i.e., flat, context region, and then the contextScore may decrease down to '0' for context regions with more and more textural detail). Then, the aforementioned shapeScore and contextScore may be combined (e.g., in the form of a multiplication operation or an F-score) to get a single "confidence" value, which may be used, at least in part, to determine the strength of the repair operation that will be applied to the artifact. According to such embodiments, it may now be appreciated that both the shapeScore and contextScore need to be fairly high (e.g., close to 1) in order for the resultant confidence value to be high (e.g., close to 1). If either score is low, the resultant confidence value will be low. Using such a scheme, whenever an artifact is passing through a highly-textured region, or whenever the artifact is highly non-circular in shape (assuming that a circular artifact is being expected), the repair operation will not risk heavily using the determined repaired pixel values in the output image; instead, the original image pixels will have the heaviest influence in the repair operation.

Figure 4:
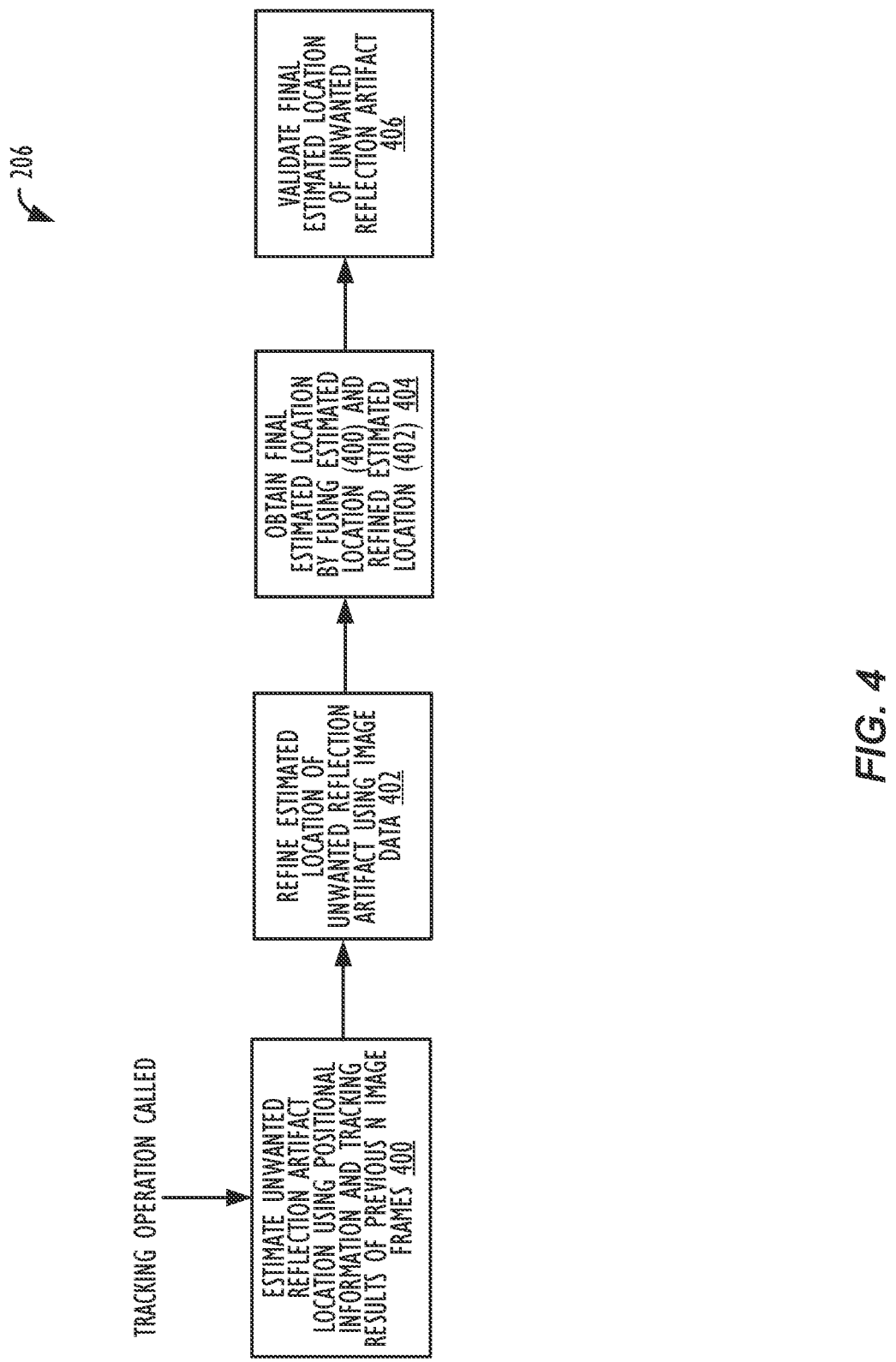
FIG. 4 is an image processing pipeline illustrating an exemplary method of performing unwanted reflection artifact tracking in video image streams, according to one or more embodiments.

FIG. 4 is an image processing pipeline 206, illustrating further details for an exemplary method of performing unwanted reflection artifact tracking in video image streams, according to one or more embodiments. First, the pipeline 206 may begin any time the tracking operation is called by image processing pipeline 200. Then, at block 400, the pipeline may proceed to estimate an unwanted reflection artifact location, e.g., using positional information obtained from the electronic device used for the image capture operations and the corresponding tracking locations determined for n previously-captured image frames. In some embodiments, a history of the n previously-determined tracked locations of a given reflection artifact may be maintained in memory. This allows for the tracking operation to generate predicted artifact locations using the previous n tracking estimates and the corresponding camera positional information obtained during the capture of the corresponding n image frames.

At block 402, the estimated unwanted reflection artifact location may be refined using image data. As described above, in some cases, an initial hypothetical artifact location may be determined by a combination of camera properties, measured positional information, and other metadata, but, due to imperfections in the camera motion modeling, pixel coloration, and/or inaccuracies in the metadata, the initial hypothetical artifact location may be off by several pixels from the actual location of the bright/fully-saturated pixels making up the unwanted reflection artifact or "green ghost" in the captured image. In some embodiments, the image-based refinement operation at block 402 may be limited to +/−a predetermined maximum permitted number of pixels (e.g., 2 pixels, 4 pixels, or 8 pixels) available to shift in each of the horizontal and vertical directions, so as to place an upper limit on the amount of additional image processing operations performed by block 402.

It is further noted that, artifact tracking operations may fail for light sources that are non-stationary or that are located at a close distance to the camera (e.g., due to parallax). However, some degree of robustness is incorporated into the artifact tracking operations to deal with slow-moving light sources and/or some parallax through the image-based refinement operations. This is because the faster the light source moves and/or the bigger the parallax, the larger the search range (i.e., +/−n pixels) may be made in the image-based refinement operations.

Then, after performing the optional refinement operation at block 402, at block 404, the estimated location of the artifact (i.e., as obtained at block 400) and the refined location of the artifact (i.e., as obtained at block 402) may be fused to get a final estimate of the artifact's location in the current image frame. This operation adds some regularization to the estimation, e.g., if the artifact is passing through a region of the image where image analysis-based techniques cannot easily recognize the artifact for a short period of time, the positional information-based prediction techniques can be used to successfully continue tracking the artifact.

Finally, at block 406 the final estimated location for the current unwanted reflection artifact may be validated. For example, in some embodiments, the current final artifact location estimate may be validated by checking it for conformity with the predictions from the previous n image frames. For example, each of the previous n predictions may give a positive vote if the current estimate is close to that prediction and a negative vote if the current estimate is far from that prediction, wherein the sum of the votes may comprise a trajectoryScore. The amount of voting contribution from each past estimate may further depend on the shapeScore of that past estimate and its proximity to current estimate. Then, if the shapeScore for the artifact or the trajectoryScore for the artifact (either individually, or in combination) are below a minimum required tracking threshold for a given implementation, the tracking operation for the current artifact may be stopped, and the image processing pipeline 200 may instead return to unwanted reflection detection process 204. If, instead, the shapeScore and the trajectoryScore for the artifact meet (either individually, or in combination) the minimum required tracking threshold for a given implementation, then the track for the current artifact may be updated with the current final artifact location estimate from block 404, and the tracking operation 206 for the current artifact may be continued with the next captured image frame.

It is further noted that, in some embodiments, more than one reflection artifact may be detected/tracked/repair in a video image stream concurrently. In such cases, even if the multiple artifacts temporarily overlap or intersect for a short time interval, the aforementioned regularization of the tracking trajectory should keep the tracks for each artifact going in the correct direction for at least a few image frames. This problem may also be aided by a data association solving algorithm or other frame matching techniques, e.g., using some appearance feature and/or trajectory match score.

In still other embodiments, the tracking operation may use calibrated lens distortion coefficients to adjust its tracking, e.g., based on the known lens focus position and optical center.

Exemplary Image Frame Buffers and Filtered Repair Confidence Values

Figure 5A:
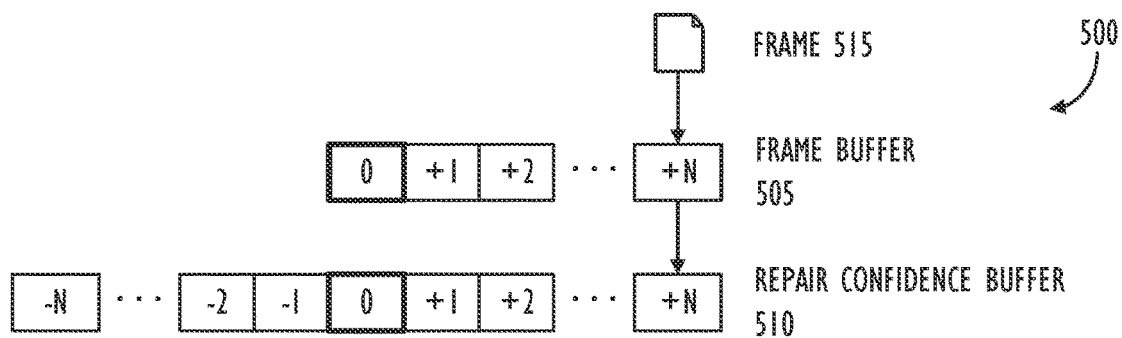
FIG. 5A shows an exemplary buffer system for image frame repair confidence values, according to one or more embodiments.

Turning now to FIG. 5A, a buffer system 500 for exemplary image frame repair confidence values is shown, according to one or more embodiments. In accordance with one embodiment, buffer system 500 includes an (N+1) entry frame buffer 505, and (2N+1) entry repair confidence value buffer 510. As each image frame 515 arrives, it is placed into the +$N^{th}$ frame buffer entry with the frame's corresponding repair confidence data placed into the +$N^{th}$ entry of the repair confidence value buffer 510. Repair confidence values (e.g., in the form of an alpha blending parameter value between 0 and 1) may come from an analysis of one more image properties of the corresponding image frame (e.g., image frame 515), such as an estimated texture level, detail level, noise level, brightness level, etc. of the respective image frame. For example, the greater the amount of texture/detail/noise etc. that is in an image frame (or region of an image frame), the lower the confidence value may be that an unwanted light reflection artifact may be repaired (i.e., successfully repaired) in that image frame (or image frame region), and thus a lower percentage of the determined repaired pixel values may be used in the blending operation with the unrepaired pixel values to determine the ultimate values of the pixels in the artifact-mitigated version of the image. As may be understood, machine learning-based repair approaches, such as "inpainting" pixel values with the output of a neural network, may struggle to more realistically repair artifacts in highly-texturized regions of images, e.g., regions with highly irregular and/or unpredictable pixel colors and patterns that are not strongly-related to the values of neighboring pixels—at least in a way that is strongly predictable by the neural network—and, thus, there may be lower confidence in the successfulness of the repairs determined for such highly-texturized regions of images.

Figure 5B:
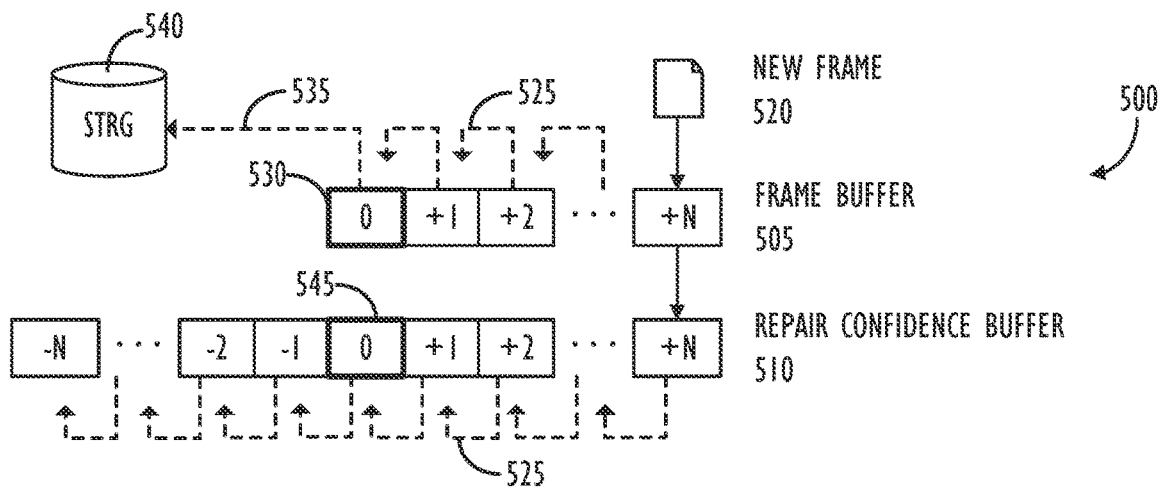
FIG. 5B shows an exemplary append operation to insert a new frame repair confidence value to a frame repair confidence buffer, according to one or more embodiments.

Referring now to FIG. 5B, an exemplary append operation to insert a new image frame repair confidence value into a frame repair confidence buffer is shown, according to one or more embodiments. As each new frame 520 arrives at buffer system 500, every entry already in frame buffer 505 and every entry in repair confidence value buffer 510 may be shifted to the left by one position, as indicated by dashed lines 525. After being filtered and repaired, frames shifted out of frame buffer entry 530 (the $0^{th}$ entry) may be routed 535 to storage 540, e.g., in the form of a video image sequence with repaired or mitigated unwanted reflection artifacts.

Repair confidence value data shifted out of repair confidence buffer entry 545 (i.e., the -$N^{th}$ entry, or, in instances where the repair confidence values of "past" image frames is not taking into account, the $0^{th}$ entry) may be discarded or retained. In buffer system 500, for example, repair confidence buffer 510 includes (2N+1) total entries: N entries corresponding to image frames captured prior to image frame 530 (i.e., entries having negative indices), and N entries corresponding to image frames captured subsequently to image frame 530 (i.e., entries having positive indices). From the point of view of an image frame currently positioned in the $0^{th}$ entry 530, positive-index entries correspond to image frames captured in the "future," while negative-index entries correspond to image frames captured in the "past."

The difference in time between the capture of an image frame placed into the +$N^{th}$ frame buffer entry and generation of an unwanted reflection artifact mitigated version of that frame from entry 530 may be dependent on the amount of time the artifact mitigation operation (e.g., 200) looks into the "future." In one embodiment, frame buffer 505 may store a specified number of image frames (e.g., 15, 30, 45, etc.). Because buffering image frames can be expensive in terms of memory, e.g., one frame at 1080p video resolution can be between 2 and 3 megabytes (MB), the optimum memory requirements of frame buffer 505 for a given implementation may be dependent upon the available memory, the amount of delay time that is acceptable between initiation of a video capture operation and generation of a first artifact-mitigated output video image frame, and the intended use of the image capture device. (The size of repair confidence buffer 510 may also typically be small compared to the size of frame buffer 505, as the only data generally stored in repair confidence buffer 510 is an integer or decimal number reflective of an estimated amount of textural detail in the region of the image that will be repaired as part of the unwanted reflection artifact mitigation process.)

Figure 5C:
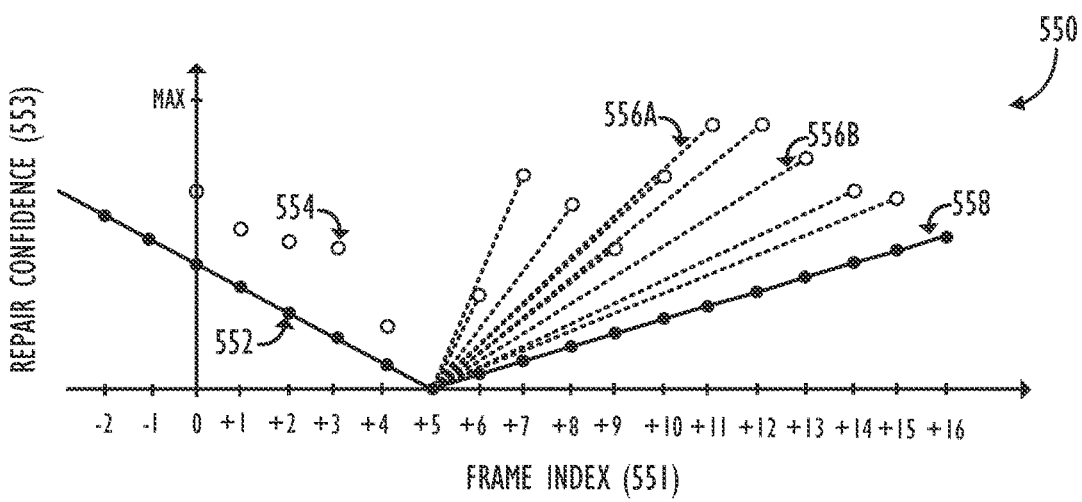
FIG. 5C is a graph, illustrating an exemplary method of performing filtering operations on frame repair confidence values, according to one or more embodiments.

Turning now to Figure 5C, a graph 550, illustrating an exemplary method of performing filtering operations on frame repair confidence values is shown, according to one or more embodiments. The horizontal axis 551 of graph 550 reflects the image frame index with respect to a current frame (i.e., the frame with index=0) of a number of frames whose repair confidence values are currently stored in a repair confidence buffer (e.g., such as repair confidence buffer 510). The vertical axis 553 of graph 550 reflects a repair confidence value to be applied to a corresponding image frame, ranging from 0 (e.g., meaning do not use any of the determined repaired pixel values in the repaired output image in the image sequence) to a "MAX" value (e.g., meaning to give the determined repaired pixel values their maximum permitted weight in a blending operation to determine the repaired output image pixel values). For example, in some instances, the maximum permitted repair confidence value may be an alpha blending value of 0.7, 0.8, 0.95, or the like. In some implementations, it may be preferable to never use a full, i.e., 1.0, alpha blending weight for the determined repair pixels, and thereby always include some influence from the original image pixel data in the final repaired image.

As illustrated in graph 550, unfilled dots (e.g., 554) represent "raw" or "unfiltered" repair confidence values for the corresponding frame whose index is shown on the horizontal axis 551, and filled dots (e.g., 552) represent temporally-smoothed or "filtered" repair confidence values for the corresponding frame whose index is shown on the horizontal axis 551.

According to some embodiments, filtering the repair confidence value for the image frame at index t=0 may comprise looking ahead in the "future" frame buffer a predetermined number of image frames, e.g., 15 frames, 30 frames, etc., and determining a "worst case" negative slope needed to stay below the corresponding unfiltered repair confidence values. As may be understood, there is a tradeoff involved in increasing the number of predetermined image frames the confidence filtering method looks ahead. That is, the more image frames ahead that the confidence filtering method looks, the more temporally-smooth the repair strength and change in artifact intensity will be. Additionally, more jarring transitions, e.g., between "MAX" repair confidence and 0 repair confidence, may be avoided. However, the repair confidence (and thus the strength of the repair applied to the artifact) ends up being weaker for an extended amount of time around each frame that requires a strength reduction, thus resulting in less overall mitigation of the appearance of the unwanted reflection artifacts over the duration of the video image sequence.

In the example of FIG. 5C, assuming the predetermined number of image frames to look ahead is 15 frames, the image frame currently at index t=+5 has the lowest repair confidence score, i.e., a repair confidence value of 0. Thus, for the image frames currently at indices t=0 to t=+5, the repair confidence filtering process may determine a "worst case" slope (i.e., the smallest magnitude slope value of 'a' to satisfy an equation y(x)=−a*x+b for the filtered repair confidence curve 558) that is configured to cause the filtered repair confidence curve (558) to stay below the respective unfiltered repair confidence value for each image frame in the upcoming predetermined number of image frames. In this example, that means the filtered repair confidence curve (558) needs to reach a filtered repair confidence value of 0 by the time the filtered repair confidence curve (558) reaches the image frame currently at index t=+5. Recall that, after each time a filtered repair confidence value is determined and stored for the image frame currently at t=0, a new image frame may be pushed into the frame buffer at the +N index, decreasing the index of all existing frames by 1 (i.e., bumping each image frame one index position to the left), and pushing out the image frame at the −N index position. The confidence filtering operation may then be repeated for each image frame that is being repaired and output to a repaired video image sequence.

Likewise, in the case of increasing or ascending unfiltered repair confidence values in the upcoming frames in the frame buffer, the repair confidence filtering operation may determine another "worst case" slope (i.e., the smallest slope value of 'a' to satisfy an equation y(x)=a*x+b for the filtered repair confidence curve 558) that is configured to cause the filtered repair confidence curve (558) to stay below the respective unfiltered repair confidence value for each image frame in the upcoming predetermined number of image frames.

In the example of FIG. 5C, the image frame that is currently between indices t=+5 and t=+16 and having the lowest repair confidence score that would allow the filtered repair confidence curve (558) to have a slope that would not exceed any of the unfiltered repair confidence values for the image frames currently between indices t=+5 and t=+16 would be the image frame currently at index t=+16. Thus, the filtered repair confidence curve (558) has determined a slope value, 'a', configured to chart a course of filtered repair confidence values for the image frames currently between indices t=+5 and t=+16 as shown by the filled dots in graph 550. (It is to be understood that, in this example, the image frame currently at t=+16 may represent the last image frame in the captured video image sequence, such that a simple, single-sloped increasing curve 558 may be determined between indices t=+5 and t=+16, but, in the event there were additional image frames from the captured video image sequence coming into the frame buffer to be processed, the slope of the filtered repair confidence curve 558 could be updated with each image frame subsequently ingested to the frame buffer, i.e., based on whatever the initial repair confidence values of such ingested image frames were.)

By contrast, if the filtered repair confidence curve (558) had instead determined a slope value, 'a', configured to chart a course of filtered repair confidence values towards the unfiltered repair confidence value of the image frame currently at index t=+11 (as shown by dashed line 556A) or the image frame currently at index t=+13 (as shown by dashed line 556B), the filtered repair confidence values would increase too rapidly, given the decreasing unfiltered repair confidence values that are known to be coming up in the image sequence, e.g., for the image frames currently at indices t=+14, t=+15, and t=+16, thus potentially resulting in too great of repair strengths being applied to output video image frames in which there is not sufficient confidence that the NN can actually determine successful artifact repair pixel values.

In some cases, the confidence filtering operation may also optionally enforce a maximum permitted per-image frame increase (or decrease) in the repair confidence value, thereby limiting overly-rapid increases (or decreases) in repair strength over short intervals of frames in the output repaired video image sequence, which could lead to temporal instability in the look and feel of the repaired region.

It is to be understood that other repair confidence filtering techniques could also be employed, e.g., depending on how much temporal smoothness was desired in a given implementation, and the techniques described above and with reference to Figure are merely exemplary. For example, different rates (e.g., slopes) could be allowed for decreasing and increasing the strength of the repair confidence value (e.g., ramping up repair confidence strengths faster than ramping down the repair confidence values), or more oscillations in the repair confidence strengths (i.e., increases followed by decreases) could be allowed over time, e.g., if less temporal smoothness of the repair intensity was desired in a given implementation. Other repair confidence filtering techniques may alternatively (or additionally) implement and use a moving or rolling average (or weighted average, e.g., a temporally-weighted average) of the upcoming unfiltered repair confidence values in the predetermined number of upcoming image frames as the filtered repair confidence value for a given image frame. It is also to be understood that, e.g., based on the needs of a given implementation, the filtered repair confidence value for a current image frame may be determined based on initial repair confidence values for: just the current image frame; the current image frame and a number of past image frames; the current image frame and a number of future image frames; or the current image frame and a number of both past and future image frames.

Figure 5D:
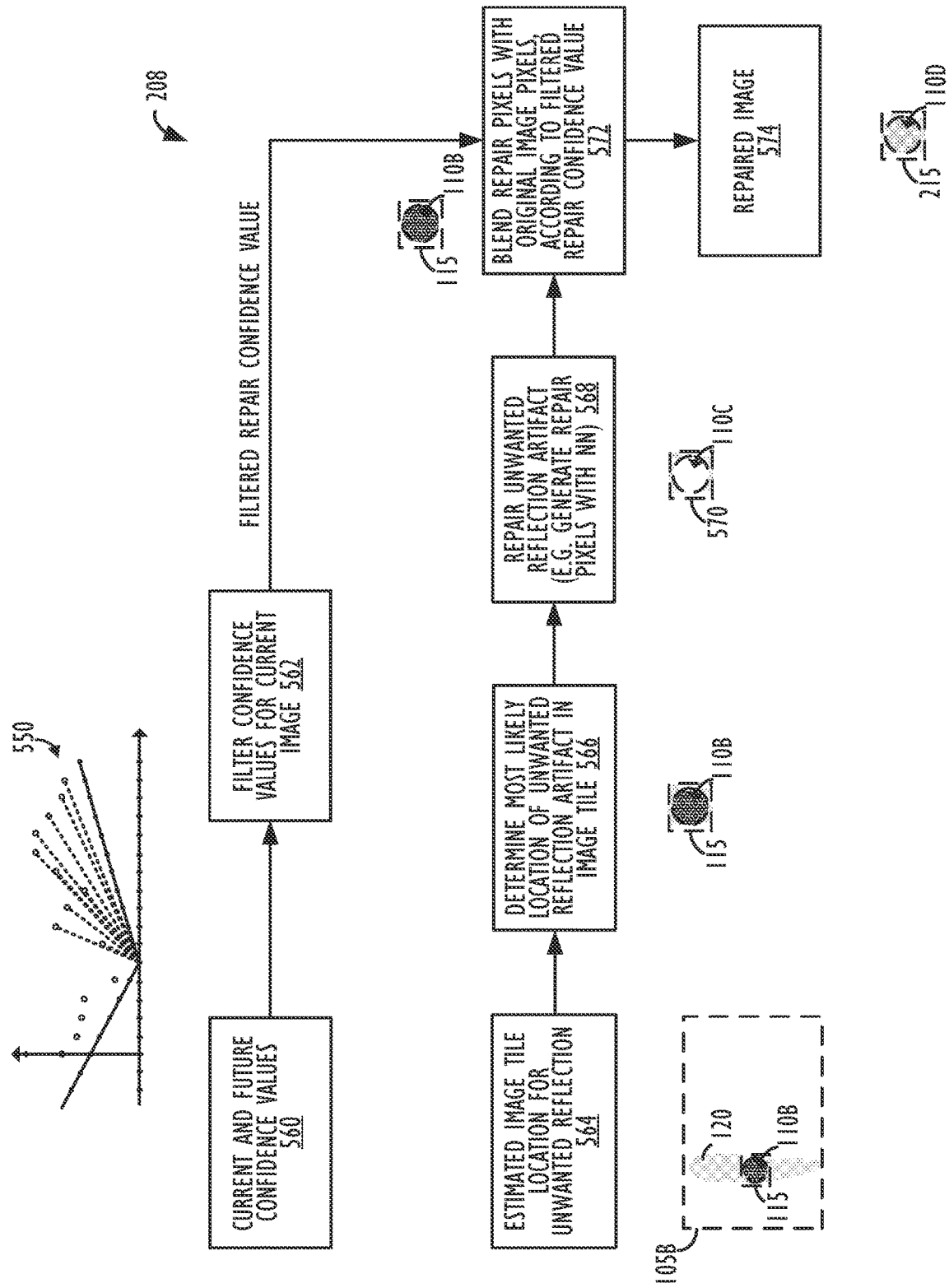
FIG. 5D is an image processing pipeline illustrating an exemplary method of performing unwanted reflection artifact mitigation in video image streams using filtered confidence values, according to one or more embodiments.

Turning now to FIG. 5D, additional details for an image processing pipeline 208 illustrating an exemplary method of performing unwanted reflection artifact mitigation in video image streams using filtered repair confidence values is shown, according to one or more embodiments. As described above, the unwanted reflection artifact mitigation pipeline may begin at block 560 by obtaining raw, i.e., "unfiltered" confidence values for a current image frame and a predetermined number of "future," image frames, i.e., image frames captured subsequently to the current image frame.

Then, at block 562, a filtering operation may be performed on the repair confidence value for the current image frame, e.g., filtering operations in accordance with those described above in reference to FIG. 5C and graph 550. In some embodiments, the filtered repair confidence values may be used to temporally smooth the intensity of the repair operations applied over time to the images in a captured image sequence (i.e., higher repair confidence values correspond to higher repair strengths/influence of determined repair pixel values in the repaired output video images, and vice versa), thereby reducing the appearance of jarring or flickering changes in the repaired region of the images over the duration of the image sequence caused by inaccurate repairs.

At block 564, an image location (e.g., a tile or region of pixels within the image) of an unwanted reflection artifact in the current image may be estimated. For example, returning to the exemplary captured scene shown in FIG. 1, image tile 115 may represent a region of pixels within the current image where the unwanted reflection artifact is estimated to be located. Next, at block 566, the artifact mitigation pipeline 208 may determine a most likely location 110B of the unwanted reflection artifact within the image tile 115. As described above, the most likely location 110B may be determined based on a probability mask, whose values may be based on an expected shape, color, intensity, etc. of the pixels in the image making up the unwanted reflection artifact. In some embodiments, the most likely location 110B may be determined by drawing an ellipse, circle, oval (or the like) within image tile 115. In some embodiments, the determined location of the unwanted reflection artifact may also be further refined within a local neighborhood of pixels using various image-based analysis techniques.

Next, at block 568, the artifact mitigation pipeline 208 may repair the unwanted reflection artifact, e.g., by generating repair pixels using a neural network (NN) or other machine learning (ML)-based technique that has been trained to repair, i.e., remove and/or mitigate, the presence of unwanted reflection artifacts in regions of images, such as by determining and inpainting new pixel values that are predicted by the NN to show what the pixels in the particular region of the image would look like if the unwanted reflection artifact was not present.

In some embodiments, the NN may comprise an encoder-decoder architecture with various skip connections, convolution blocks, residual blocks, upscaling blocks, concatenation operations, and batch normalization operations. In some implementations, the NN may obtain a 4-channel input (e.g., a 3-channel representation of the color pixel values in a region of the image concatenated with a 1-channel bit mask, representing the predicted location of the artifact within the region), and it may produce a 3-channel output image that reflects the color pixel values of the repaired version of the image region. In some implementations, different NN architectures may be used in the mitigation operation, e.g., depending on the estimated size and/or complexity of the green ghost artifacts identified in the image.

In some embodiments, the NN may be trained on a combination of synthetic image data and real image data. The synthetic image data may comprise random shapes and colors of artifacts (e.g., based on the shapes and colors of ghosting artifacts that have been observed in "real world" captured images) or shapes and colors of artifacts pulled directly from actual real-world images that are then composited onto artifact-free regions of synthetic images. In this way, the artifact-including versions and the artifact-free versions of the regions of the synthetic images may serve as "ground truth" image pairs, i.e., the NN may measure and refine its performance during training by comparing its produced results (i.e., the determined or "hallucinated" pixel values for the repaired region) to the corresponding artifact-free versions of the image regions that it is operating on. During the network training, various loss functions may be used and minimized, including a L1 loss function, a perceptual loss function and, in some cases, a generative adversarial network (GAN) may also be turned on after some number of epochs during the training process, at which point a GAN loss may also be used to further train and refined the network's performance.

Of course, in other embodiments, non-ML-based techniques (e.g., techniques that do not involve the use of trained NNs) maybe used in the repair operation. For example, in some such embodiments, the saturation of pixels in the artifact region may be reduced directly and/or other heuristic-based (i.e., non-ML) pixel repair techniques may be applied to mitigate the appearance of the reflection artifact in the image.

Finally, at block 572, the repaired pixels (e.g., those shown in location 110C of image tile 570) may be blended with the original, unrepaired image pixels (e.g., those shown in location 110B of image tile 115) according to the filtered repair confidence value for the current image (e.g., as determined at block 562). For example, in some cases, the filtered repair confidence value may be used as an alpha parameter value in an alpha blending operation between the aforementioned repaired pixels and the original, unrepaired pixels. Repaired image tile 570 represents the result of the unwanted reflection artifact being repaired (e.g., as represented in FIG. 5D by location 110C being much lighter in image tile 570 than it appears in location 110B in unrepaired image tile 115). As mentioned above, the more confidence there is in the NN's ability to repair the unwanted reflection artifact (e.g., with repair confidence values typically being inversely related to how much textural detail appears in the region of the image that is being repaired), the more that the blending operation at block 572 may rely upon the repaired pixel values determined at block 568 when determining the values of the pixels in the final repaired image at block 574 (e.g., those shown in location 110D of image tile 215). Conversely, the less confidence there is in the NN's ability to repair the unwanted reflection artifact, the more that the blending operation at block 572 may weight the original pixel values of the region (e.g., those shown in location 110B of image tile 115) in an ensuing blending operation.

Final (or "blended") repaired image tile 215 thus illustrates that the result of the unwanted reflection artifact repair operation is the generation of pixels in the repaired region that have values falling somewhere in between the original image pixel values and the full-strength repaired pixel values, e.g., as generated by a trained NN. For example, the blending operation used to generate the final repaired image tile pixel values in image tile 215 is illustrated in FIG. 5D as having light gray pixels in location 110D, i.e., a blend between the much lighter pixel values in location 110C of repaired image tile 570 and the much darker pixel values in location 110B from the unrepaired image tile 115). By blending the repaired pixel values with the original pixels for each image frame according to intelligently-filtered repair confidence values, the artifact mitigation techniques described herein can reduce or avoid any unwanted (and potentially visually jarring) flickering in the repaired region of the images over the duration of the image sequence—especially in regions of images where the confidence in a NN's ability to determine successful artifact repair pixel values is low.

Figure 6:
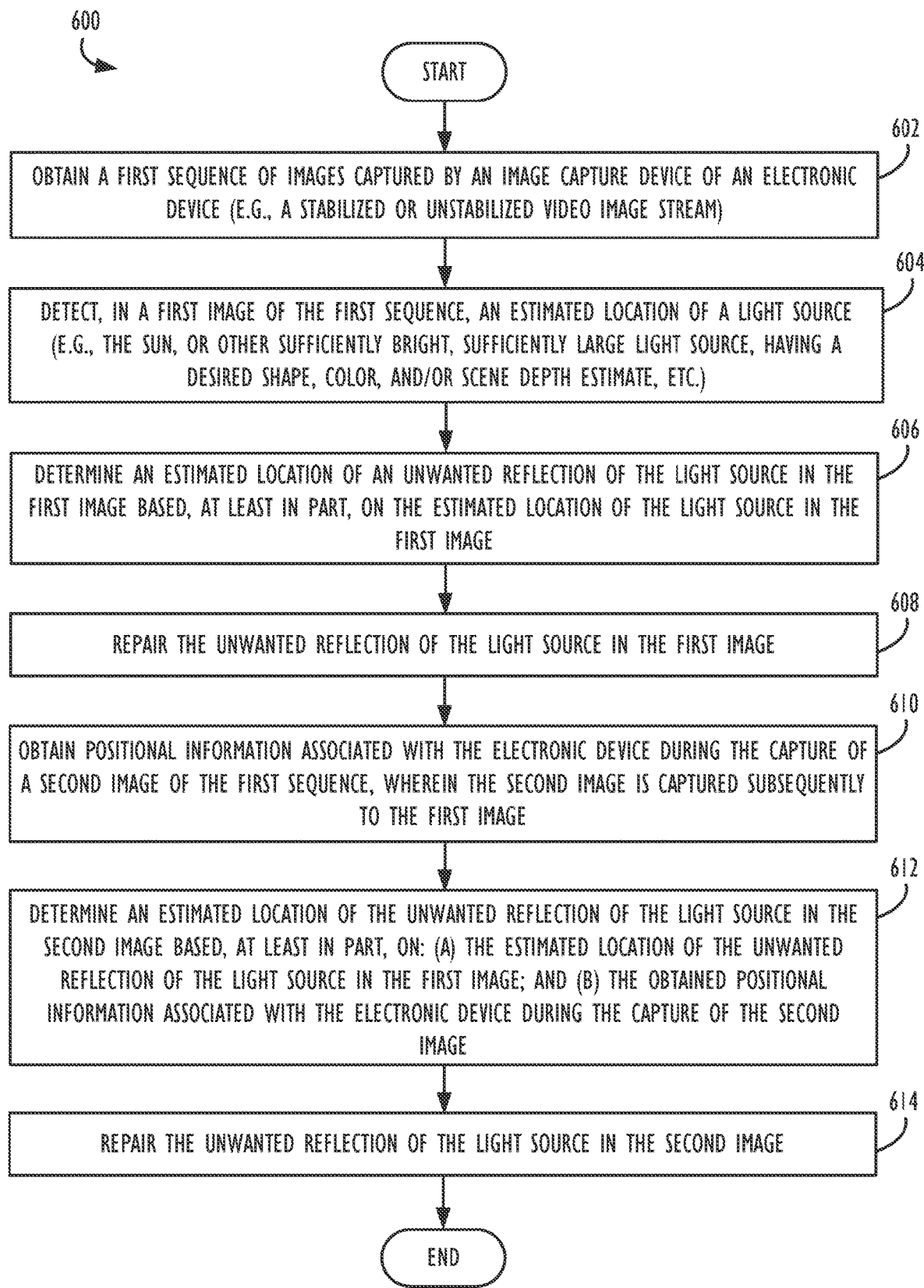
FIG. 6 is a flow chart illustrating an exemplary method of performing unwanted reflection artifact mitigation in video image streams, according to one or more embodiments.

Exemplary Image Processing Operations for Unwanted Reflection Artifact Mitigation in Video Image Streams FIG. 6 is a flow chart illustrating an exemplary method of performing unwanted reflection artifact mitigation in video image streams, according to one or more embodiments. First, at Step 602, the method 600 may obtain a first sequence of images captured by an image capture device of an electronic device (e.g., a stabilized or unstabilized video image stream). Next, at Step 604, the method 600 may detect, in a first image of the first sequence, an estimated location of a light source (e.g., the Sun, or other sufficiently bright, sufficiently large light source, having a desired shape, color, and/or scene depth estimate, etc.). In other embodiments, multiple bright light sources potentially causing unwanted reflection artifacts in an image may also be detected, tracked, and repaired simultaneously, subject to any processing, power usage, and/or time limitations faced by the electronic device performing the repair operations.

Next, at Step 606, the method 600 may determine an estimated location of an unwanted reflection artifact of the light source in the first image based, at least in part, on the estimated location of the light source in the first image. As described above, the unwanted reflection artifact may take the shape of a brightly-colored spot, circle, ring, or halo that reflects the shape of a bright light source in the captured scene. Next, at Step 608, the method 600 may repair the unwanted reflection of the light source in the first image, e.g., according to the artifact mitigation techniques described above with reference to FIGS. 2 and 5D.

Next, at Step 610, the method 600 may obtain positional information associated with the electronic device during the capture of a second image of the first sequence, wherein the second image is captured subsequently to the first image. At Step 612, the method 600 may determine an estimated location of the unwanted reflection of the light source in the second image based, at least in part, on: (a) the estimated location of the unwanted reflection of the light source in the first image; and (b) the obtained positional information associated with the electronic device during the capture of the second image. Finally, at Step 614, the method 600 may repair the unwanted reflection of the light source in the second image, e.g., according to the artifact mitigation techniques described above with reference to FIGS. 2 and 5D.

As stated above, the techniques described in FIG. 6 may be repeated across some or all of the images in a captured image sequence, with the reference to "first image" and "second image" merely being representative of the operations that could be carried out on exemplary images of the image sequence, and not being intended to limit the performance of the techniques to image sequences having only two images. For example, the more processing-intensive light source detection and artifact location operations of Steps 604/606 may be performed only after each time a predetermined number of images (e.g., 30 images) have been captured as part of the first sequence of images or after a given artifact can no longer be successfully tracked, while the less processing-intensive artifact tracking operations of Steps 610/612 may be performed on each of the other images in the first sequence of images (e.g., the 29 images captured in between each $30^{th}$ image).

Exemplary Electronic Computing Devices

Figure 7:
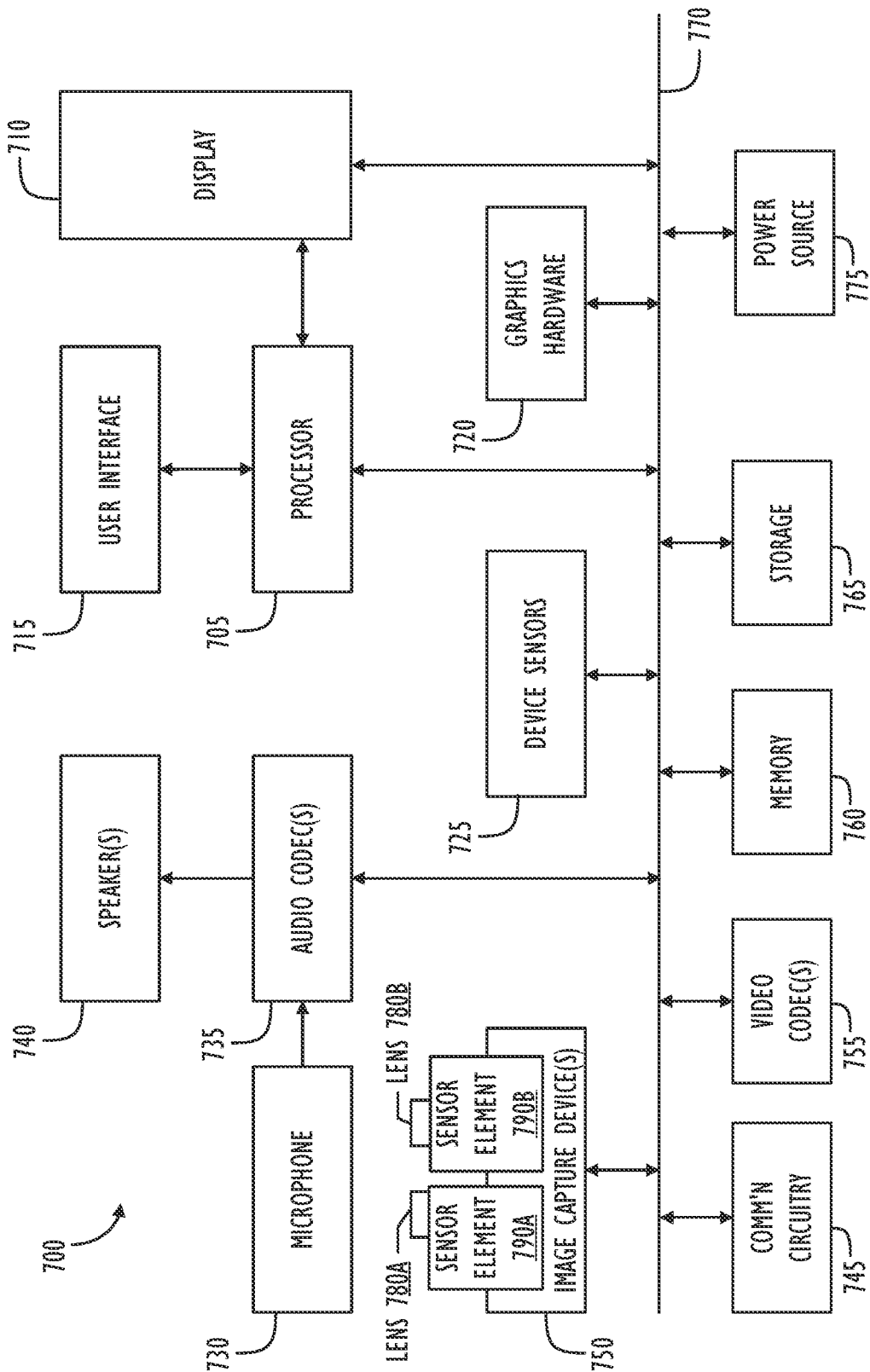
FIG. 7 is a block diagram illustrating a programmable electronic computing device, in which one or more of the techniques disclosed herein may be implemented.

Referring now to FIG. 7, a simplified functional block diagram of illustrative programmable electronic computing device 700 is shown according to one embodiment. Electronic device 700 could be, for example, a mobile telephone, personal media device, portable camera, or a tablet, notebook or desktop computer system. As shown, electronic device 700 may include processor 705, display 710, user interface 715, graphics hardware 720, device sensors 725 (e.g., proximity sensor/ambient light sensor, accelerometer, inertial measurement unit, and/or gyroscope), microphone 730, audio codec(s) 735, speaker(s) 740, communications circuitry 745, image capture device(s) 750, which may, e.g., comprise multiple camera units/optical image sensors having different characteristics or abilities (e.g., Still Image Stabilization (SIS), high dynamic range (HDR), optical image stabilization (OIS) systems, optical zoom, digital zoom, etc.), video codec(s) 755, memory 760, storage 765, and communications bus 770.

Processor 705 may execute instructions necessary to carry out or control the operation of many functions performed by electronic device 700 (e.g., such as the generation and/or processing of images in accordance with the various embodiments described herein). Processor 705 may, for instance, drive display 710 and receive user input from user interface 715. User interface 715 can take a variety of forms, such as a button, keypad, dial, a click wheel, keyboard, display screen and/or a touch screen. User interface 715 could, for example, be the conduit through which a user may view a captured video stream and/or indicate particular image frame(s) that the user would like to capture (e.g., by clicking on a physical or virtual button at the moment the desired image frame is being displayed on the device's display screen). In one embodiment, display 710 may display a video stream as it is captured while processor 705 and/or graphics hardware 720 and/or image capture circuitry contemporaneously generate and store the video stream in memory 760 and/or storage 765. Processor 705 may be a system-on-chip (SOC) such as those found in mobile devices and include one or more dedicated graphics processing units (GPUs). Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 perform computational tasks. In one embodiment, graphics hardware 720 may include one or more programmable graphics processing units (GPUs) and/or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device(s) 750 may comprise one or more camera units configured to capture images, e.g., images which may be processed to generate enhanced versions of said captured images, e.g., in accordance with this disclosure. Image capture device(s) 750 may include two (or more) lens assemblies 780A and 780B, where each lens assembly may have a separate focal length. For example, lens assembly 780A may have a shorter focal length relative to the focal length of lens assembly 780B. Each lens assembly may have a separate associated sensor element, e.g., sensor elements 790A/790B. Alternatively, two or more lens assemblies may share a common sensor element. Image capture device(s) 750 may capture still and/or video images. Output from image capture device(s) 750 may be processed, at least in part, by video codec(s) 755 and/or processor 705 and/or graphics hardware 720, and/or a dedicated image processing unit or image signal processor incorporated within image capture device(s) 750. Images so captured may be stored in memory 760 and/or storage 765.

Memory 760 may include one or more different types of media used by processor 705, graphics hardware 720, and image capture device(s) 750 to perform device functions. For example, memory 760 may include memory cache, read-only memory (ROM), and/or random access memory (RAM). Storage 765 may store media (e.g., audio, image and video files), computer program instructions or software, preference information, device profile information, and any other suitable data. Storage 765 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 760 and storage 765 may be used to retain computer program instructions or code organized into one or more modules and written in any desired computer programming language. When executed by, for example, processor 705, such computer program code may implement one or more of the methods or processes described herein. Power source 775 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 700.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A method, comprising:
   obtaining a first sequence of images captured by an image capture device of an electronic device;
   detecting, in a first image of the first sequence, an estimated location of a light source;
   determining an estimated location of an unwanted reflection of the light source in the first image based, at least in part, on the estimated location of the light source in the first image;
   repairing the unwanted reflection of the light source in the first image;
   obtaining positional information associated with the electronic device during the capture of a second image of the first sequence, wherein the second image is captured subsequently to the first image;
   determining an estimated location of the unwanted reflection of the light source in the second image based, at least in part, on: (a) the estimated location of the unwanted reflection of the light source in the first image; and (b) the obtained positional information associated with the electronic device during the capture of the second image; and
   repairing the unwanted reflection of the light source in the second image.

2. The method of claim 1, wherein the light source comprises the Sun.

3. The method of claim 1, wherein the positional information comprises information obtained from one or more of: (a) a gyrometer integrated into the electronic device; (b) an accelerometer integrated into the electronic device; or (c) an optical image stabilization (OIS) system of the image capture device of the electronic device.

4. The method of claim 1, wherein the estimated location of the unwanted reflection of the light source in the first image comprises a region of pixels.

5. The method of claim 4, wherein a size of the region of pixels is determined based, at least in part, on one or more of:
   a focus level of the image capture device during capture of the first image; or
   a zoom level of the image capture device during capture of the first image.

6. The method of claim 4, further comprising:
   determining a probability value for each pixel in the region of pixels,
   wherein the probability value for a given pixel corresponds to an estimated likelihood that the given pixel is part of the unwanted reflection of the light source in the first image.

7. The method of claim 4, wherein determining an estimated location of an unwanted reflection of the light source in the first image further comprises:
   identifying an elliptical sub-region of pixels within the region of pixels.

8. The method of claim 7, wherein repairing the unwanted reflection of the light source in the first image comprises:
   utilizing a trained neural network (NN) to determine values for the pixels in the identified elliptical sub-region of pixels,
   wherein the NN is trained to determine pixel values that remove unwanted light source reflections from regions of images.

9. The method of claim 8, wherein repairing the unwanted reflection of the light source in the first image further comprises:
   determining values for the pixels in the identified elliptical sub-region of pixels by blending between: (a) the values for the pixels in the identified elliptical sub-region of pixels determined by the NN; and (b) the values of the pixels in the identified elliptical sub-region of pixels in the first image as captured.

10. The method of claim 9, wherein the blending operation is performed according to an estimated repair confidence parameter, and wherein the estimated repair confidence parameter reflects an estimated confidence level in the ability of the values for the pixels in the identified elliptical sub-region of pixels determined by the NN to repair the unwanted reflection of the light source in the first image.

11. The method of claim 10, wherein the estimated repair confidence parameter is determined by:
    estimating an initial repair confidence parameter value for the first image; and
    filtering the value of the initial repair confidence parameter for the first image based, at least in part, on initial repair confidence parameter values estimated for one or more images from the first sequence of images captured subsequently to the first image.

12. The method of claim 1, further comprising:
    detecting an estimated location of a light source in an image of the first sequence each time a predetermined number of images have been captured as part of the first sequence of images.

13. The method of claim 12, further comprising, for each image captured as part of the first sequence of images for which an estimated location of a light source is not detected:
   obtaining positional information associated with the electronic device during the capture of said image captured as part of the first sequence of images for which an estimated location of a light source is not detected; and
   determining an estimated location of the unwanted reflection of the light source in said image captured as part of the first sequence of images for which an estimated location of a light source is not detected based, at least in part, on: (a) the estimated location of the unwanted reflection of the light source in the immediately preceding image captured as part of the first sequence of images; and (b) the obtained positional information associated with the electronic device during the capture of said image captured as part of the first sequence of images for which an estimated location of a light source is not detected.

14. The method of claim 1, wherein determining the estimated location of the unwanted reflection of the light source in the first image further comprises:
   mirroring the estimated location of the light source across a principal point of a lens of the image capture device of the electronic device.

15. The method of claim 1, wherein repairing the unwanted reflection of the light source in the second image is further based, at least in part, on an estimated color cast of the second image.

16. An electronic device, comprising:
   a memory;
   a first image capture device;
   a first positional sensor and
   one or more processors operatively coupled to the memory, wherein the one or more processors are configured to execute instructions causing the one or more processors to:
      obtain a first sequence of images captured by the image capture device;
      detect, in a first image of the first sequence, an estimated location of a light source;
      determine an estimated location of an unwanted reflection of the light source in the first image based, at least in part, on the estimated location of the light source in the first image;
      repair the unwanted reflection of the light source in the first image;
      obtain positional information from the first positional sensor during the capture of a second image of the first sequence, wherein the second image is captured subsequently to the first image;
      determine an estimated location of the unwanted reflection of the light source in the second image based, at least in part, on: (a) the estimated location of the unwanted reflection of the light source in the first image; and (b) the obtained positional information associated with the electronic device during the capture of the second image; and
      repair the unwanted reflection of the light source in the second image.

17. The electronic device of claim 16, wherein the one or more processors are further configured to execute instructions causing the one or more processors to:
      detect an estimated location of a light source in an image of the first sequence each time a predetermined number of images have been captured as part of the first sequence of images.

18. The electronic device of claim 17, wherein the one or more processors are further configured to execute instructions causing the one or more processors to:
   for each image captured as part of the first sequence of images for which an estimated location of a light source is not detected:
      obtain positional information from the first positional sensor during the capture of said image captured as part of the first sequence of images for which an estimated location of a light source is not detected; and
      determine an estimated location of the unwanted reflection of the light source in said image captured as part of the first sequence of images for which an estimated location of a light source is not detected based, at least in part, on: (a) the estimated location of the unwanted reflection of the light source in the immediately preceding image captured as part of the first sequence of images; and (b) the positional information obtained from the first positional sensor during the capture of said image captured as part of the first sequence of images for which an estimated location of a light source is not detected.

19. A non-transitory computer readable medium comprising computer readable instructions executable by one or more processors to:
   obtain a first sequence of images captured by an image capture device of an electronic device;
   detect, in a first image of the first sequence, an estimated location of a light source;
   determine an estimated location of an unwanted reflection of the light source in the first image based, at least in part, on the estimated location of the light source in the first image;
   repair the unwanted reflection of the light source in the first image;
   obtain positional information associated with the electronic device during the capture of a second image of the first sequence, wherein the second image is captured subsequently to the first image;
   determine an estimated location of the unwanted reflection of the light source in the second image based, at least in part, on: (a) the estimated location of the unwanted reflection of the light source in the first image; and (b) the obtained positional information associated with the electronic device during the capture of the second image; and
   repair the unwanted reflection of the light source in the second image.

20. The non-transitory computer readable medium of claim 19, wherein the positional information comprises information obtained from one or more of: (a) a gyrometer integrated into the electronic device; (b) an accelerometer integrated into the electronic device; or (c) an optical image stabilization (OIS) system of the image capture device of the electronic device.

* * * * *